United States Patent
Bretschneider et al.

(10) Patent No.: US 10,417,882 B2
(45) Date of Patent: Sep. 17, 2019

(54) DIRECTION SENSITIVE MOTION DETECTOR CAMERA

(71) Applicant: The Chamberlain Group, Inc., Oak Brook, IL (US)

(72) Inventors: Eric C. Bretschneider, Bowling Green, KY (US); James J. Fitzgibbon, Batavia, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

(21) Appl. No.: 15/792,329

(22) Filed: Oct. 24, 2017

(65) Prior Publication Data
US 2019/0122513 A1    Apr. 25, 2019

(51) Int. Cl.
| | | |
|---|---|---|
| *G01B 11/02* | (2006.01) | |
| *G01B 11/14* | (2006.01) | |
| *G08B 13/196* | (2006.01) | |
| *G06T 7/254* | (2017.01) | |

(52) U.S. Cl.
CPC ...... *G08B 13/19608* (2013.01); *G01B 11/026* (2013.01); *G01B 11/14* (2013.01); *G06T 7/254* (2017.01)

(58) Field of Classification Search
CPC . G08B 13/19608; G06T 7/254; G01B 11/026; G01B 11/14
See application file for complete search history.

(56) References Cited

U.S. PATENT DOCUMENTS

| | | |
|---|---|---|
| 6,385,772 B1 | 5/2002 | Courtney |
| 6,396,534 B1 | 5/2002 | Mahler |
| 6,859,148 B2 | 2/2005 | Miller |
| 7,772,991 B2 | 8/2010 | Rao |
| 8,164,628 B2 | 4/2012 | Stein |
| 8,611,598 B2 | 12/2013 | Yankun |
| 8,933,797 B2 | 1/2015 | Deigmoller |
| 9,058,524 B2 | 6/2015 | Kuehnle |
| 2007/0098274 A1 | 5/2007 | Ibrahim |
| 2008/0162561 A1 | 7/2008 | Naphade |

(Continued)

OTHER PUBLICATIONS

Andrew Kirillov; Motion Detection Algorithms; Code Project dated Mar. 27, 2007; https://www.codeproject.com/Articles/10248/Motion-Detection-Algorithms?display=Print; pp. 1-9.

(Continued)

*Primary Examiner* — Hung H Lam
(74) *Attorney, Agent, or Firm* — Fitch, Even, Tabin, & Flannery LLP

(57) ABSTRACT

A motion detector camera is configured to differentiate between an object or objects passing through the field of view of the camera and an object or objects approaching the sensor. In one example, motion is detected with a camera configured to identify and selectively filter specific directions of motion. The motion detector compares pixel changes, corresponding to the basic area or size of the object, from frame to frame, and detects the amount of increase in change or decrease in change. An increasing change in the area or size of an object indicates that an object is approaching, and a decreasing change in the area or size of an object indicates that an object that is receding.

18 Claims, 17 Drawing Sheets

(56) References Cited

U.S. PATENT DOCUMENTS

| | | |
|---|---|---|
| 2009/0245573 A1 | 10/2009 | Saptharishi |
| 2011/0206359 A1 | 8/2011 | Nishimura |
| 2012/0218406 A1* | 8/2012 | Hanina .................. G06F 3/017 348/143 |
| 2012/0229630 A1* | 9/2012 | Huang .................... G06T 7/254 348/143 |
| 2014/0160283 A1 | 6/2014 | Hofman |
| 2014/0286424 A1 | 9/2014 | Kim |
| 2014/0333775 A1 | 11/2014 | Naikal |
| 2014/0368649 A1* | 12/2014 | Chen ..................... H04N 7/183 348/143 |
| 2015/0139607 A1 | 5/2015 | Grunberg |
| 2015/0381950 A1* | 12/2015 | Su ......................... H04N 7/185 348/143 |
| 2016/0269615 A1* | 9/2016 | Deng ....................... G06T 7/80 |
| 2016/0286171 A1 | 9/2016 | Cheng |

OTHER PUBLICATIONS

Yuval Kashter, Ofer Levi and Adrian Stem; Optical Compressive Change and Motion Detection; Corresponding Author stem@bgu. ac.il; Department of Electro-Optics Engineering, Ben-Gurion University of the Negev Israel; pp. 1-23; 2012.

* cited by examiner

FIELD OF VIEW

FIELD OF VIEW

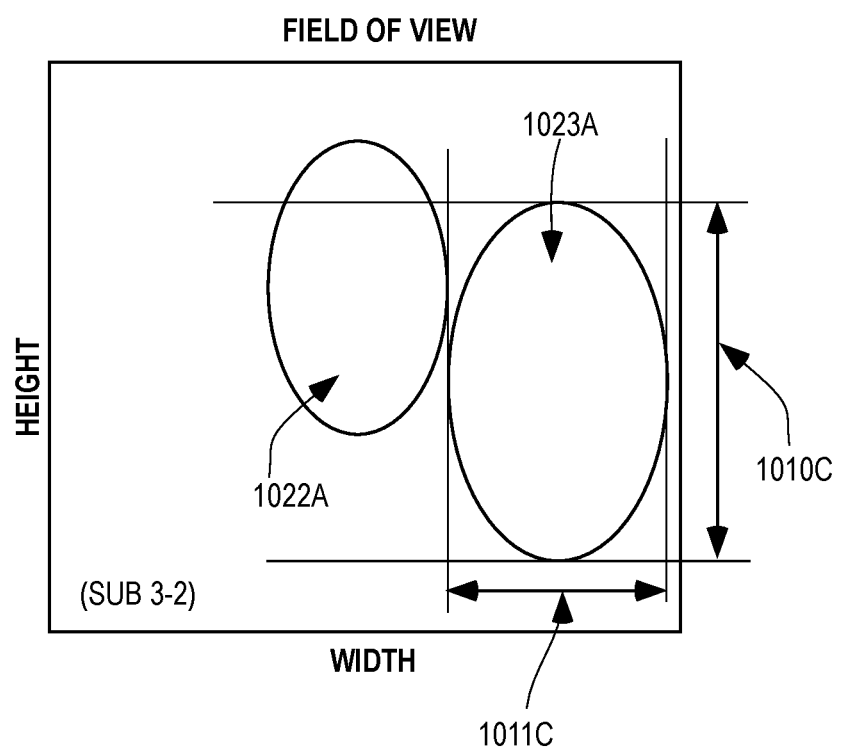

DIRECTION SENSITIVE MOTION DETECTOR CAMERA

TECHNICAL FIELD

This disclosure relates generally to motion detector devices and, in particular, to detecting motion of an object in the field of view of a camera, wherein the motion detector is configured to differentiate between an object passing through the field of view and an object approaching the motion detector.

BACKGROUND

Motion detection with a camera is generally done by monitoring the number of pixels that have changed from frame to frame, with respect to a reference or "background" frame. Motion is defined as exceeding a specific number of pixel changes. Additionally, some camera or motion detection systems are designed to ignore specific areas of the frame which are defined by a user. Furthermore, motion detection either with a camera or a Pyroelectric Infrared (PIR) sensor do not differentiate between an object passing through the field of view of the camera and an object moving towards or away from the motion detector sensor. This can cause indiscriminate motion detections, which trigger events such as an intruder detection alarm system.

SUMMARY

Generally speaking, pursuant to these various embodiments, a motion detector camera is configured to differentiate between an object or objects passing through the field of view of the camera and an object or objects approaching the sensor. In one example, motion is detected with a camera configured to identify and selectively filter specific directions of motion. The motion detector compares pixel changes, corresponding to the basic area or size of the object, from frame to frame, and detects the amount of increase in change or decrease in change. An increasing change in the area or size of an object indicates that an object is approaching, and a decreasing change in the area or size of an object indicates that an object that is receding.

This arrangement enables reducing false positive detections of objects approaching the camera. Furthermore, it allows the camera to be mounted to a residence near a street with a sidewalk without requiring a high quantity of pixel change for motion detection, and it also alleviates the problem of an object (e.g., a leaf) falling across the lens as being falsely identified as a motion event because the object is not approaching nor it is approaching too fast.

These and other aspects will be understood and appreciated upon making a thorough review and study of the following detailed description.

BRIEF DESCRIPTION OF THE DRAWINGS

FIG. 9, constituted by FIGS. 9A-9F, is an illustrative view of objects determined using the method of the flow diagram of FIG. 8 where:

FIG. 10, constituted by FIGS. 10A-10C, is an illustrated view of another embodiment related to the flow diagram of FIG. 8 where:

FIG. 10C shows how the height and width of an object are measured for the combination of the second frame and the third frame.

FIG. 11, constituted by FIGS. 11A-11C, is an illustrative view of another embodiment related to the flow diagram of FIG. 8 where:

FIG. 12, constituted by FIGS. 12A-12C, is an illustrative view of another embodiment related to the flow diagram of FIG. 8 where:

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 13:
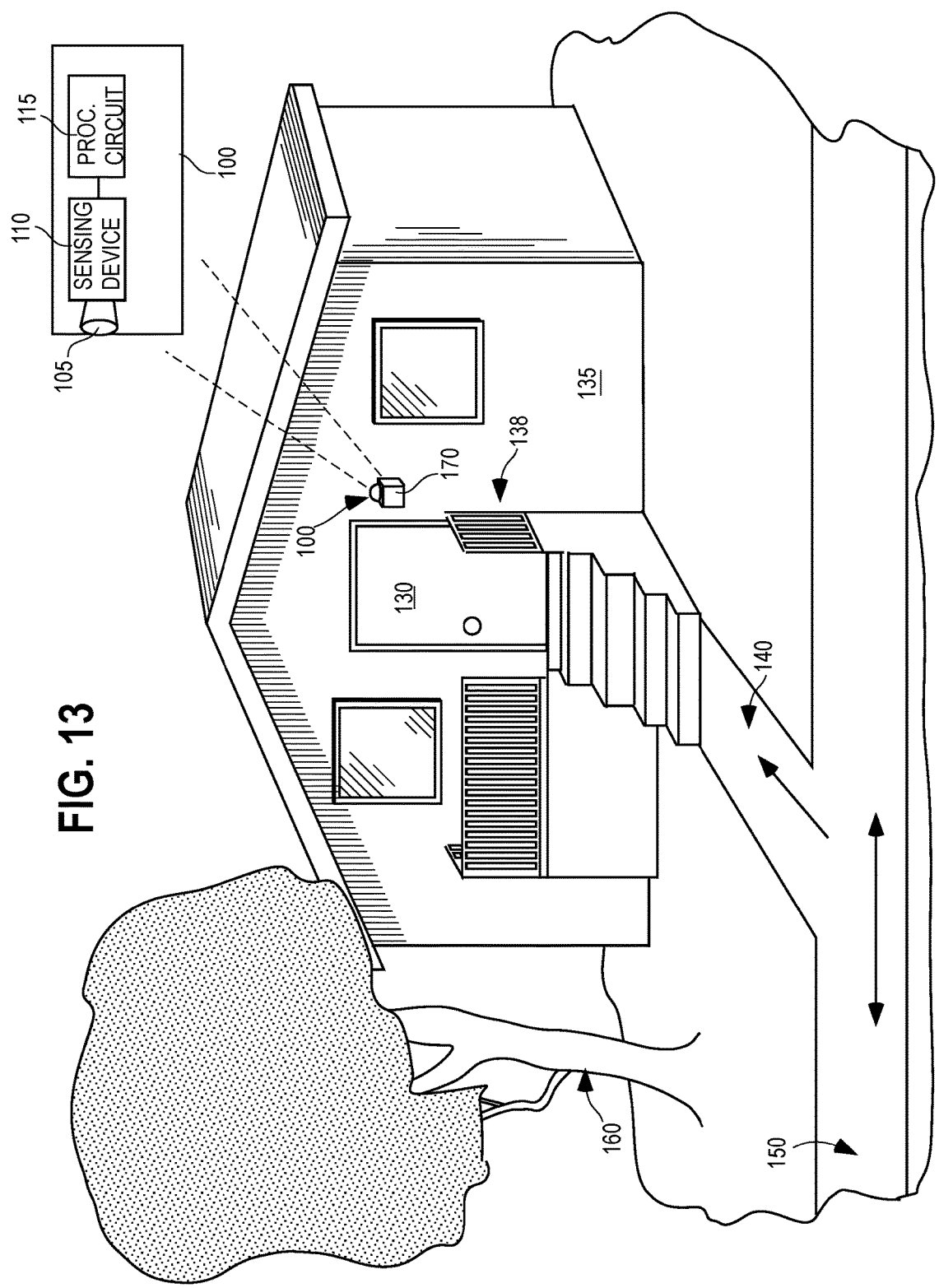
FIG. 13 comprises a perspective view of an example operating environment for a camera including an in-set detail view of an example camera in accordance with various embodiments.

Referring now to the drawings, and in particular to FIG. 13, an example camera mounted near a building entrance and configured in accord with various embodiments of the invention will be described. In this example, a camera 100 is mounted near a door 130 of a home 135 although in practice the camera 100 can be mounted in various locations and environments to detect approaching motion. In the illustrated example, the field of view for camera 100 will include at least a portion of a porch 138 near the door 130, a walkup path 140, and a sidewalk 150 that extends past the house 135. In this example, the camera 100 is configured to output a signal in response to detecting someone or something approaching the door 130. Thus, people walking along the sidewalk 150 will not trigger the signal until they approach the house 135 (e.g., via the walkup path 140) sufficiently far for the camera 100 to detect the approaching motion. Also, false positives triggered by objects such as falling leaves from a tree 160 are less likely to trigger an approaching object signal. The camera 100 then can be operatively linked to a light 170 that can be triggered to illuminate in response to detection of an approach. The light may function to add additional security by illuminating the surrounding environment. Additionally, a user may receive an image sent from the camera on a mobile device (e.g., a cellular phone or tablet), and the illumination from the light provides a clearer image to the user.

The camera 100 includes a lens 105 or other optical elements configured to focus light from an area near the camera 100 onto a sensing device 110. The sensing device 110 typically is an image sensor, examples of which include a semiconductor charge-coupled device (CCD) or active pixel sensors in complementary metal-oxide-semiconductor (CMOS) or N-type metal-oxide-semiconductor (NMOS, Live MOS) technologies. The sensing device 110 converts light hitting the sensor into electrical signals representing the amount and, optionally, the wavelength of the light. The sensing device 110 is operatively connected to a processing device 115 (e.g., a digital signal processor (DSP) or image signal processor), which processes the electrical signals from the sensing device to save the signals as data representative of the images detected by the camera. Each set of data represents a frame captured by the camera. Depending on the configuration, the processing device 115 may cause operation of other devices.

To determine whether an object in the images is approaching the camera 100, the processing device 115 processes the images in a particular way to reduce the instances of false positives. By one approach, the processing device 115 detects a first size for an object in a field of view for a first frame captured by the camera 100. In a second frame captured by the camera 100 later in time than the first frame, the processing device 115 detects a second size for the object in the field of view. The first size is compared to the second size for the object, and in response to determining that the second size is larger than the first size by more than a first threshold, the processing device automatically effects execution of a first action by a device in communication with the camera. For example, a light associated with the camera may be automatically lit in response to detecting that an object is approaching the camera to illuminate the area whereas illumination of the light is suppressed in response to other motion detection (for example, if a person is merely walking by the house on which the camera is mounted instead of approaching its door).

Figure 1:
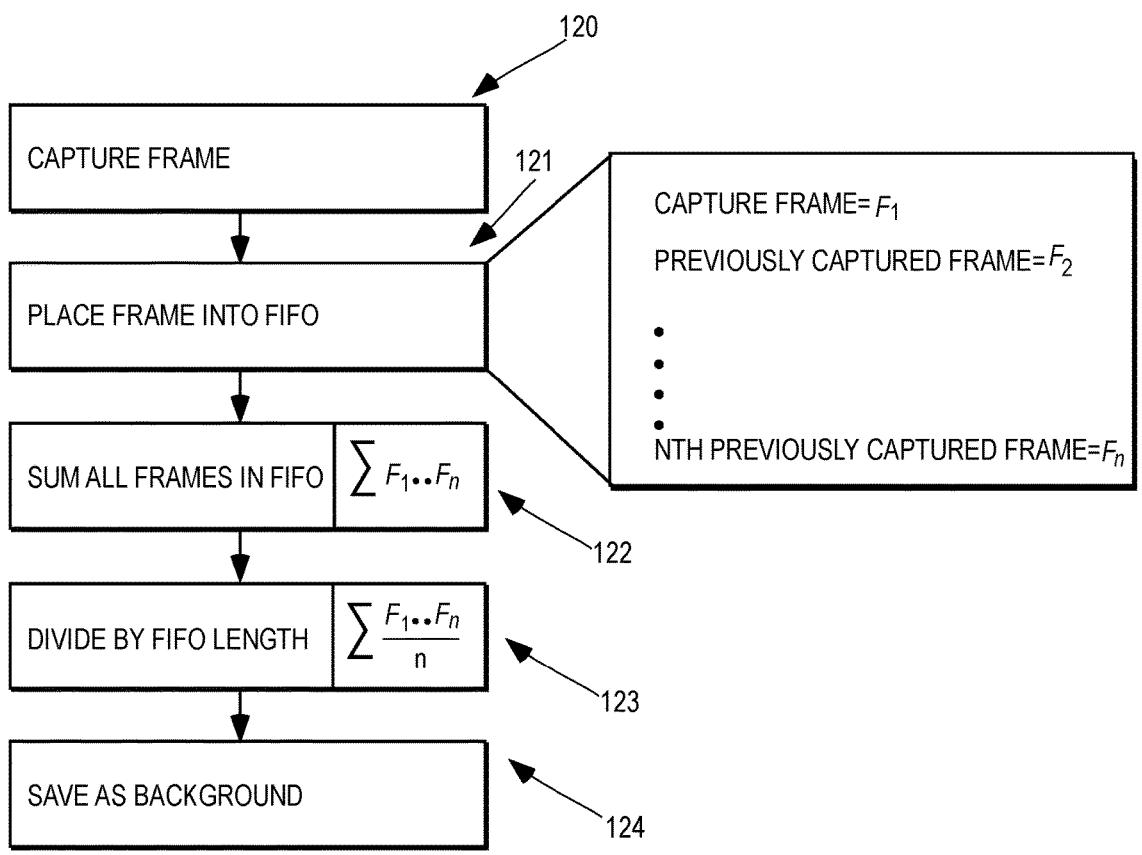
FIG. 1 shows a flow diagram illustrating an example method performed by a direction sensitive motion detector camera.

Detecting the size of the object can be accomplished in different ways. In one approach, the processing device determines a reference (or "background") from a direction sensitive motion detector camera as illustrated in FIG. 1. In this example, the background is the average pixel brightness across a set of at least two frames captured by the camera, and is calculated as follows. The camera captures 120 a single frame, $F_1$, and frame $F_1$ is then placed 121 in a first-in first-out (FIFO) memory. The pixel brightness of frames $F_1$ through $F_n$, where $F_n$ is the nth previously captured frame, are then summed 122 together. The background is then determined by dividing 123 the aggregate pixel brightness by the total number of frames, n, and saved 124. The pixel brightness can be calculated for a monochrome camera, a channel of a color camera (e.g., Red, Green, or Blue), any combination of the channels of the camera, or any or all of the channels evaluated independently. In another example, the background can be calculated as an average of the pixel brightness within a single frame, but this approach can be less reliable when compared to using multiple frames.

The calculated background value (or values), here the average pixel brightness, can then be used to determine the motion of an object in the camera's field of view. In this example, the average pixel brightness is compared to a pixel brightness value for each pixel in the field of view of the first frame. An object in the field of view is defined as a set of pixels in the field of view of the first frame having a brightness value different from the average pixel brightness by a brightness threshold. The brightness value may be different by being either brighter or dimmer than the background value by the brightness threshold. The brightness threshold may be set to be above a level of noise adequate to account for normal brightness fluctuations for a given camera application. In the case where two frames are used to detect an object, a second frame is captured later in time than a first frame. In one approach, the first size of the object is defined as a first frame total number of pixels in the field of view of the first frame having a brightness value different from the average pixel brightness by the brightness threshold. When using the total number of pixels differing from the background, the change in size of the object between the two frames can be determined by comparing the first frame total number of pixels in the field of view of the first frame to a second frame total number of pixels in the field of view of the second frame having a brightness value different from an average pixel brightness for at least two frames captured by the camera by the brightness threshold.

Figure 2:
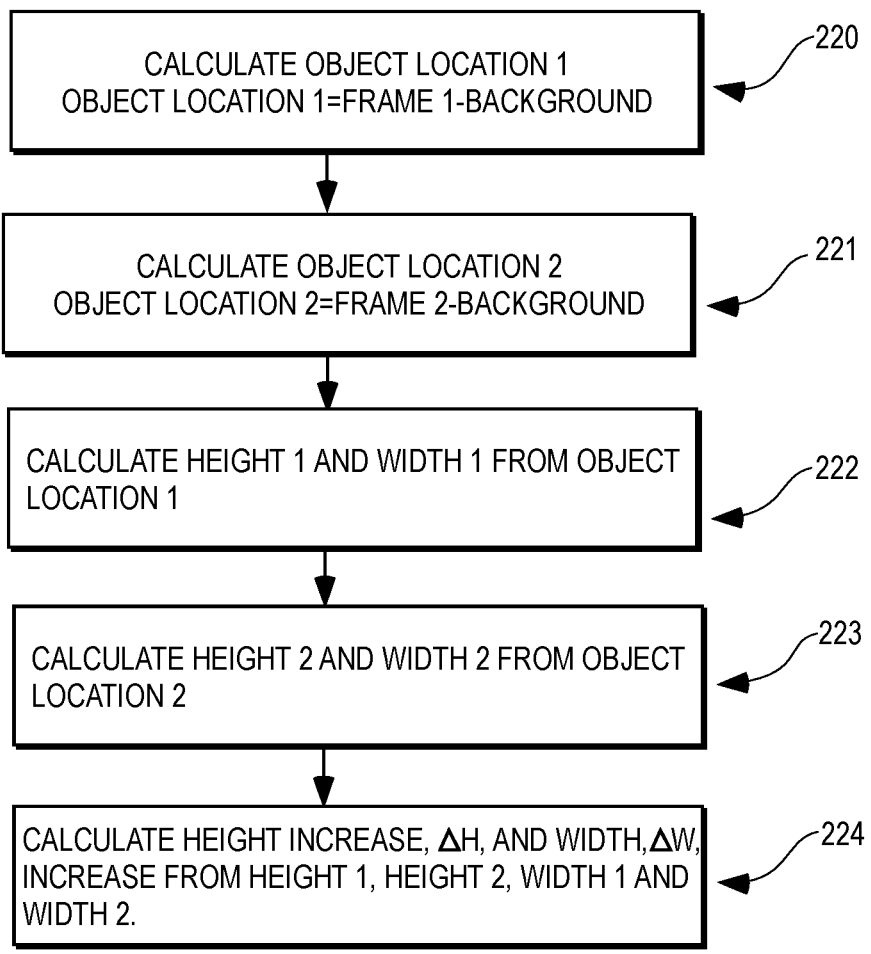
FIG. 2 shows a flow diagram illustrating an example method of determining a size and a location of an object in a frame.

FIG. 2 shows an example method of determining the location and the size of an object or objects in a frame. To determine 220 the object location for the first captured frame, the background is subtracted from the first frame, Frame 1. In this approach, the brightness of each pixel in the background is subtracted from the corresponding pixel's brightness of Frame 1. The location of the object in a proceeding frame, Frame 2, can be determined 221 in a similar manner as Frame 1.

Determining the first size of the object in Frame 1 comprises defining the size of the object as a total number of pixels in the field of view of Frame 1 having a brightness value different from the noise level of the brightness threshold.

In one example, calculating 222 a height and width of the object in Frame 1 is further defined as one or both of a maximum or average width and a maximum or average height of contiguous pixels with a brightness value different from the average pixel brightness by the brightness threshold. Calculating 223 a height and width of the object in Frame 2 may be done in a similar manner. Both frames (i.e., Frame 1 and Frame 2) include a set of contiguous pixels having brightness values above a threshold of the noise level, otherwise motion may not be detected by this method. In this example, a change in width (or left-right movement) gives a change in position, and a change in height (front-back movement) gives a change in size.

From the determined height and width of the object in each frame, one can calculate 224 the change in height and the change in width of the object from Frame 1 to Frame 2. For example, the maximum or average height and width of contiguous pixels in the field of view of Frame 1 is compared to the maximum or average height and width of contiguous pixels in the field of view of Frame 2.

Figure 3A:
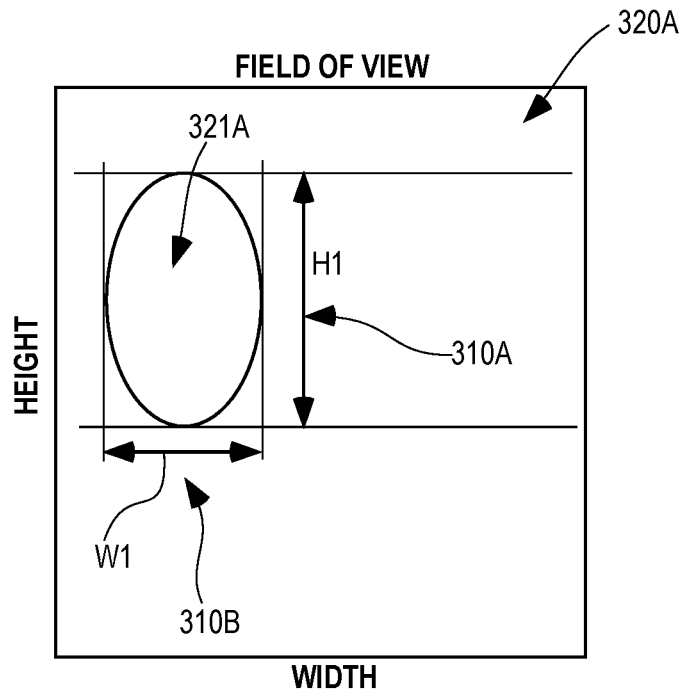
FIG. 3A shows an example object in a field of view of a camera with the object having particular dimensions.
Figure 3B:
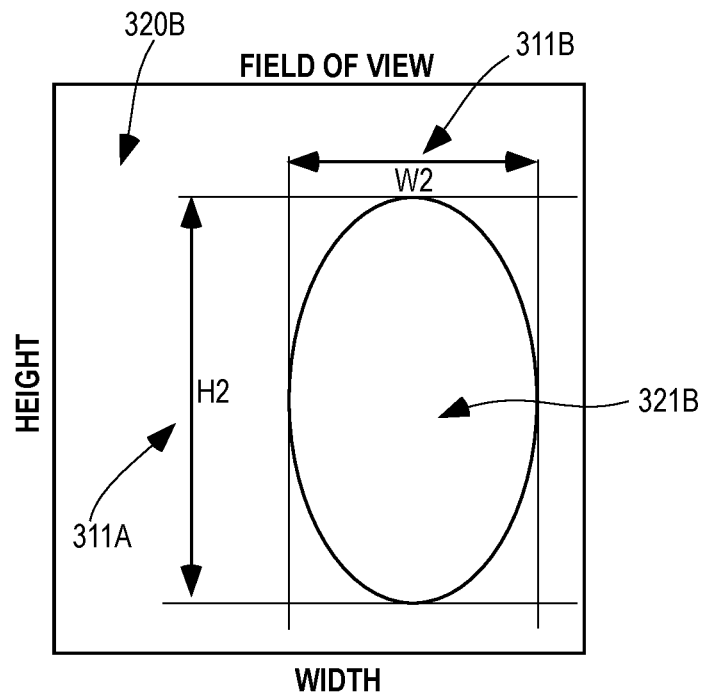
FIG. 3B shows an example object in a field of view of a camera with the object having different dimension as compared to FIG. 3A.
Figure 4:
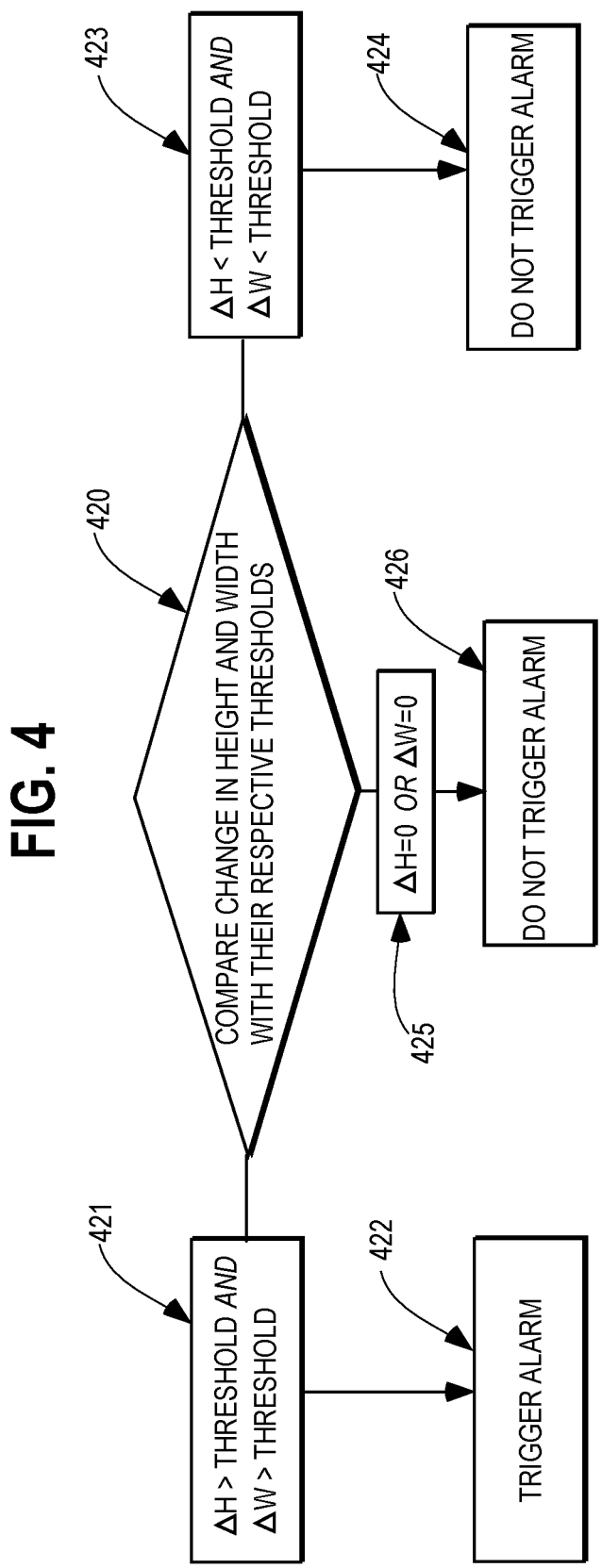
FIG. 4 shows a flow diagram illustrating an example of determining the motion of an object by comparing the change in height ΔH and width ΔW between consecutive frames to a threshold value.
Figure 5:
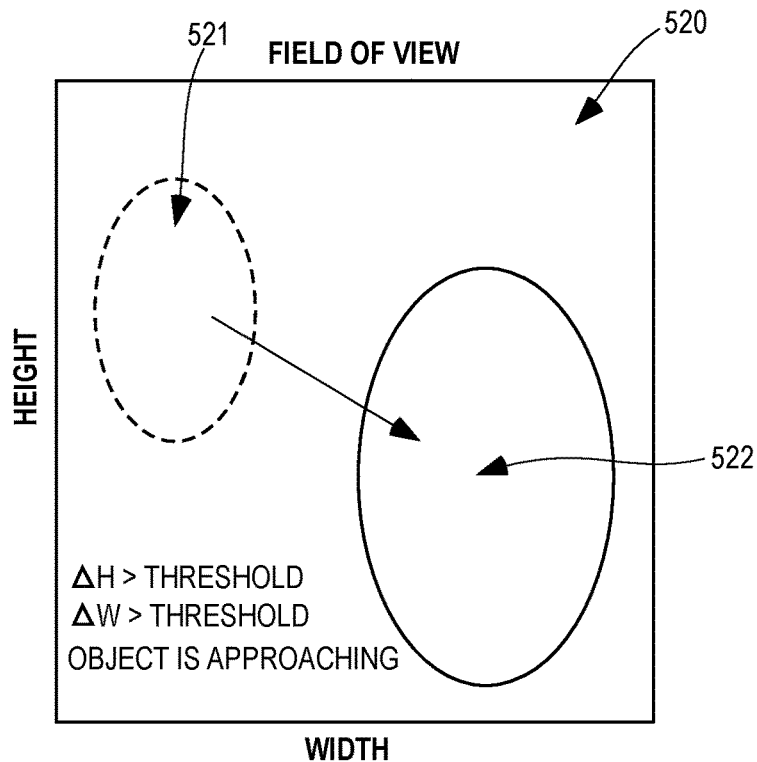
FIG. 5 shows an example of the combined frames of FIG. 3A and FIG. 3B where the object is determined to be approaching the camera.

As shown in FIG. 3A and FIG. 3B, to determine motion in this example, the changes in height $\Delta H$ and width $\Delta W$ between consecutive frames are compared to a threshold noise level value. A change in height and a change in width can be calculated in numerous ways depending on the desired functionality of the system's operation. For example, a subtraction $\Delta H=H2-H1$, $\Delta W=W2-W1$ would detect the change in height and width, but the sensitivity to the changes would be greater when the object is closer to the camera. In another example, motion detection is achieved by finding the percentage of change $\Delta H=(H2-H1)/H1$, and $\Delta W=(W2-W1)/W1$. This percent change calculation would potentially have a similar level of sensitivity to object motion at both far and close distances to the camera. There are a number of other mathematical functions one can use to compute the amount of change. Regardless of the change comparison method adopted, detecting approaching motion under this embodiment may entail detecting both a change in height $\Delta H$ above a threshold and a change in width $\Delta W$ above a threshold, and not just one or the other As an example, an object 321A of Frame 1 (320A) has a height H1 (310A) and width W1 (310B). At a later time in Frame 2 (320B) the object 321B has a height H2 (311A) and width W2 (311B). FIG. 4 is a flow diagram showing the sensitivity to motion detection via comparing 420 the change in height, $\Delta H=H2-H1$, and the change in width, $\Delta W=W2-W1$, between Frame 1 (320A) and Frame 2 (320B) with their respective thresholds. To determine if an object is moving towards the camera an approach threshold is set, and if $\Delta H$ and $\Delta W$ are greater than their respective thresholds 421, then a first action by a device in communication with the camera is automatically executed 422. For example, the first action may be an alarm being triggered or a light turned on or both. An example of this situation is shown in FIG. 5 with a combined frame 520 (Frame 1 and Frame 2 overlapping) to illustrate that as the object moves through the field of view of the camera from the first location 521 to the second location 522, both $\Delta H$ and $\Delta W$ are greater than their respective thresholds, and therefore the object is determined to be approaching the camera.

Figure 6:
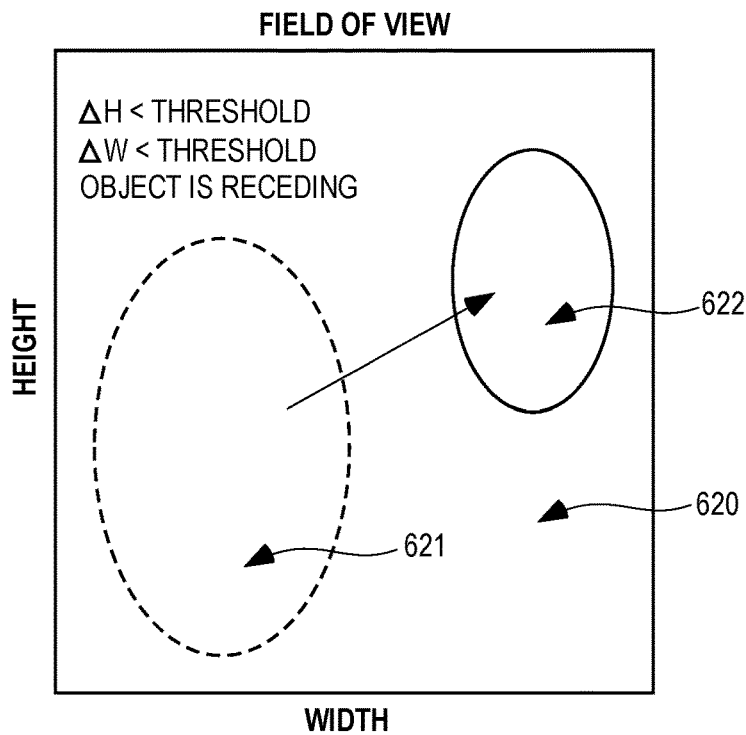
FIG. 6 shows an example of the combined frames of FIG. 3A and FIG. 3B where the object is determined to be receding from the camera.
Figure 7:
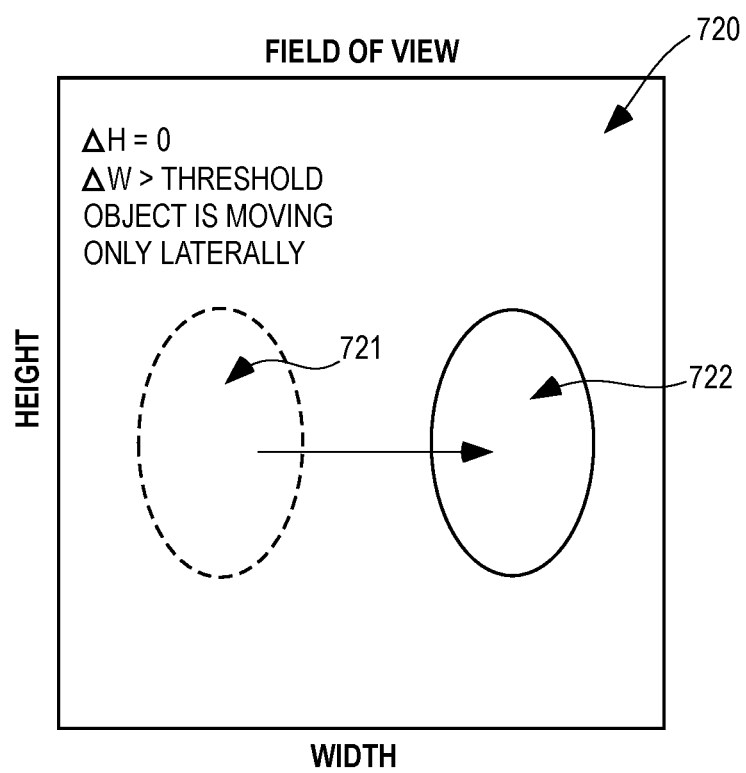
FIG. 7 shows an example of the combined frames of FIG. 3A and FIG. 3B where the object is determined to be moving laterally.

The converse may occur, such that $\Delta H$ and $\Delta W$ are lesser than their respective thresholds 423. FIG. 6 shows a combined frame 620 (Frame 1 and Frame 2 overlaid) to illustrate that as the object moves through the field of view of the camera from the first location 621 to the second location 622, both $\Delta H$ and $\Delta W$ are smaller than their respective thresholds, and the object is determined to be receding, retreating, or otherwise moving away from the camera. In this example, with brief reference to FIG. 4, no action is executed 424. FIG. 7 is another illustrative example in which the object moves laterally across the field of view from the first location 721 to the second location 722. As shown, $\Delta W$ may exceed a threshold value 425, however $\Delta H=0$ (or a value substantially close to zero). In this configuration, the alarm will not sound 426, because the absence of a change in height signifies an object moving laterally across the field of view and not towards the camera. This method provides additional discrimination in determining motion such that false positives from objects (e.g., automobiles or pedestrians) that are simply passing by or traversing/translating laterally through the field of view are reduced or prevented.

In addition to using a fixed threshold, in certain approaches the threshold is adjusted according to the recent history of motion detection. For example, if the system detects motion towards the camera that is below threshold in a first reading, and then detects motion towards the camera in a second frame, the acceptance threshold (i.e., the threshold above which it is determined that the motion detected is motion in the forward approaching direction) can be reduced because the object is approaching slowly. In one specific example, the acceptance threshold may be set to one minute in order to identify an object approaching very slowly and trigger an alarm.

A similar formulation can be set such that the rate of change of an object passing in front of the camera is too rapid, and should not trigger an alarm, such as a leaf falling through the field of view or a bird quickly flying by. In one application of this approach, a series of sizes for the object is detected over a series of frames captured by the camera between capturing the first frame and the second frame where a size of the object in a given frame of the series of frames is defined as a total number of pixels in the field of view of the given frame having a brightness value different from the average pixel brightness by the brightness threshold. Then, determining that the second size is larger than the first size includes determining that the sizes of the object are increasing over the series of frames and that a percentage of change of the sizes of the object over the series of frames exceeds a percentage threshold. In a specific example, the alarm may only be triggered if the rate of change of the object's size is less than 5%. If the rate of change is larger than 5%, then the object is deemed to be approaching too quickly, and the alarm is not triggered. Furthermore, the 5% threshold could be adjusted to a higher percentage threshold if it is found to be too sensitive (e.g., the alarm was triggered too many times in a day).

In another embodiment, a method of using a camera to detect the direction of motion in a field of view is performed by using at least three frames captured at different times by the camera. In this example, a calculation of the background as described in the previous embodiment is not included. Instead, location (or "compound location") and motion are determined by finding overlapping areas of above-threshold pixel brightness amongst three captured frames. The method includes comparing pixel brightness for a set of pixels from the first frame to a corresponding set of pixels from the second frame to remove a background and to define a first pixel set having a brightness difference greater than a pixel brightness threshold. The method further includes comparing pixel brightness for a set of pixels from the second frame to a corresponding set of pixels from the third frame to remove a background and to define a third pixel set having a brightness difference greater than a pixel brightness threshold. The size of the first pixel set is compared to the size of the second pixel set. In one instance, the processing device executing the method determines that the size of the second pixel set is larger than the size of the first pixel set by more than a first threshold. In response to the size of the second pixel set being larger than the size of the first pixel set by more than the first threshold, the processing device automatically effects execution of a first action by a device in communication with the camera, such as turning on a light that illuminates the field of view for the camera.

Figure 8:
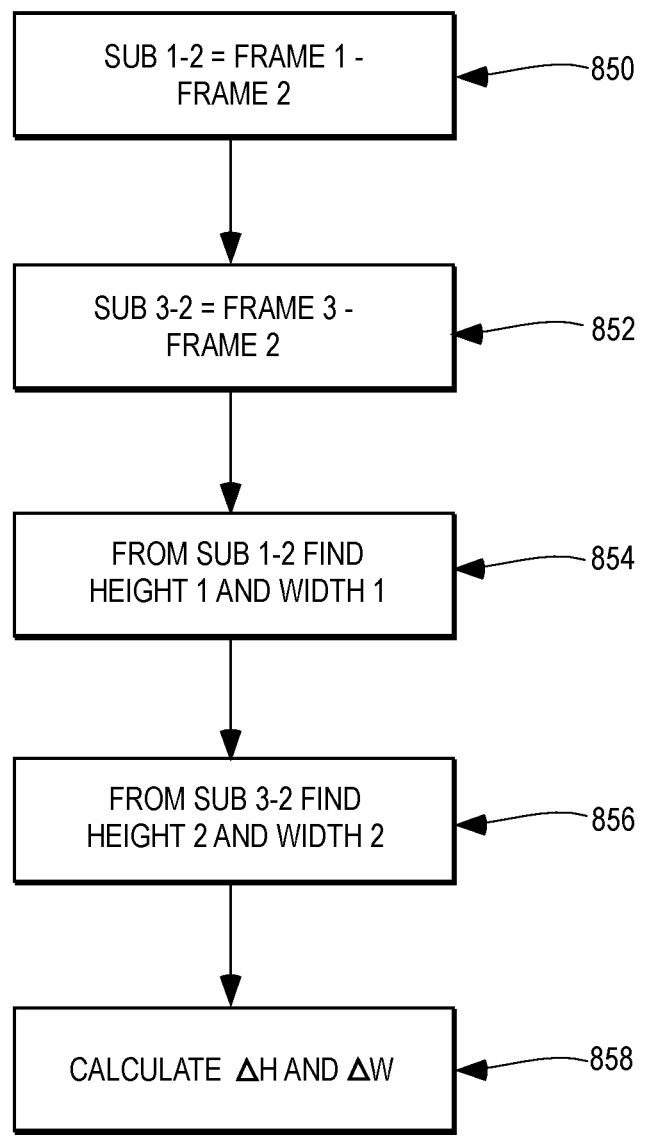
FIG. 8 shows a flow diagram illustrating an example of determining the motion of an object by using at least three frames captured at different times by the camera.
Figure 9A:
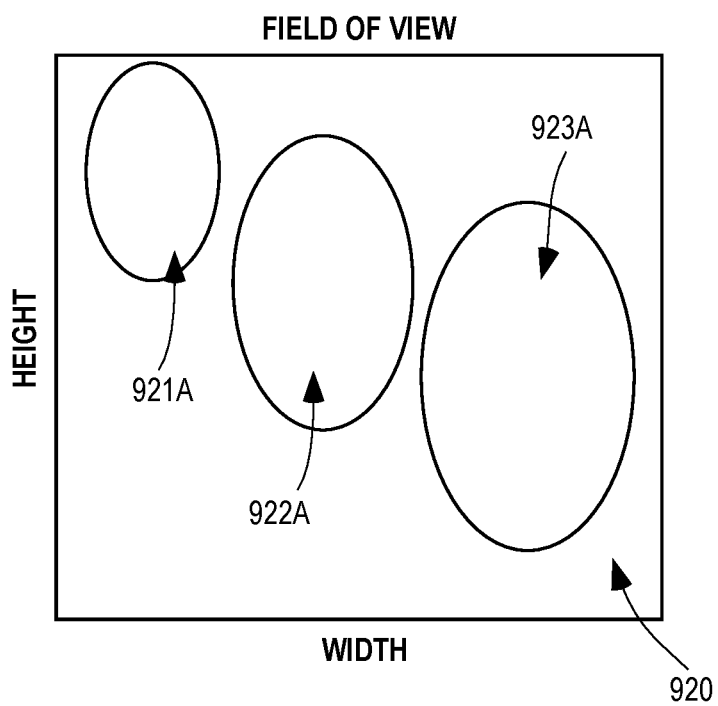
FIG. 9A shows the combination of an object of a first frame, an object of a second frame, and an object of a third frame in the field of view of a camera.
Figure 9B:
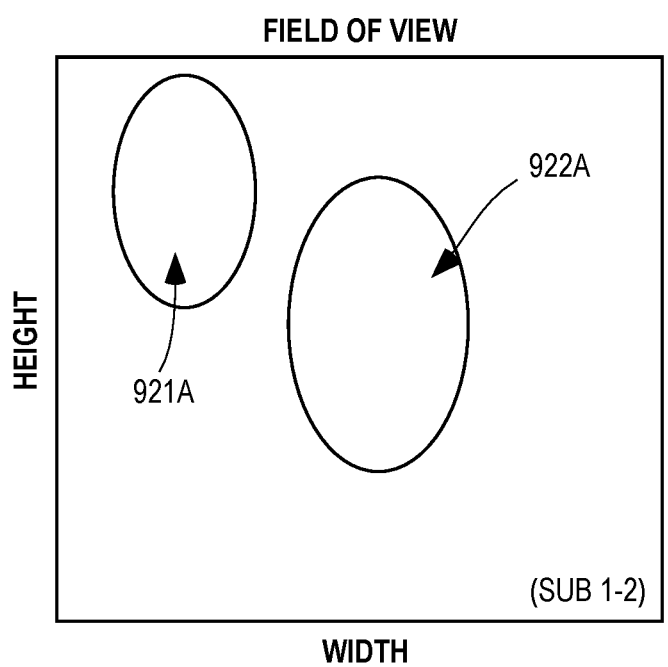
FIG. 9B shows a subtraction of the second frame from the first frame of FIG. 9A.
Figure 9C:
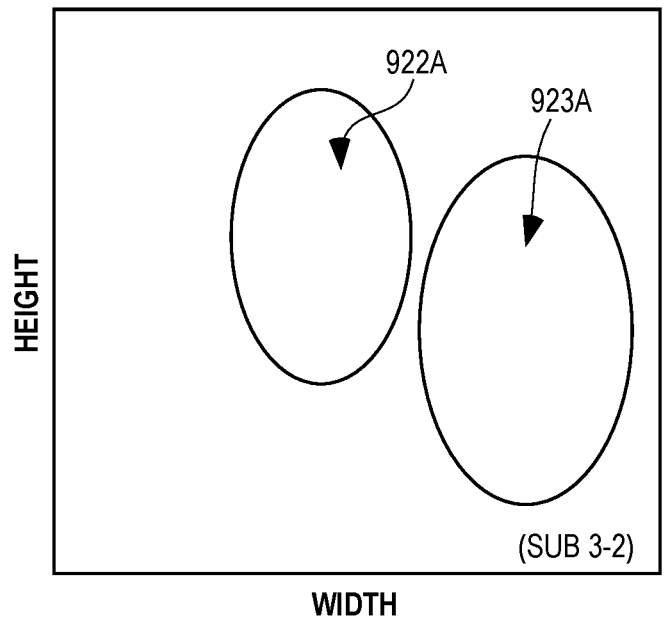
FIG. 9C shows a subtraction of the second frame from the third frame of FIG. 9A.
Figure 9D:
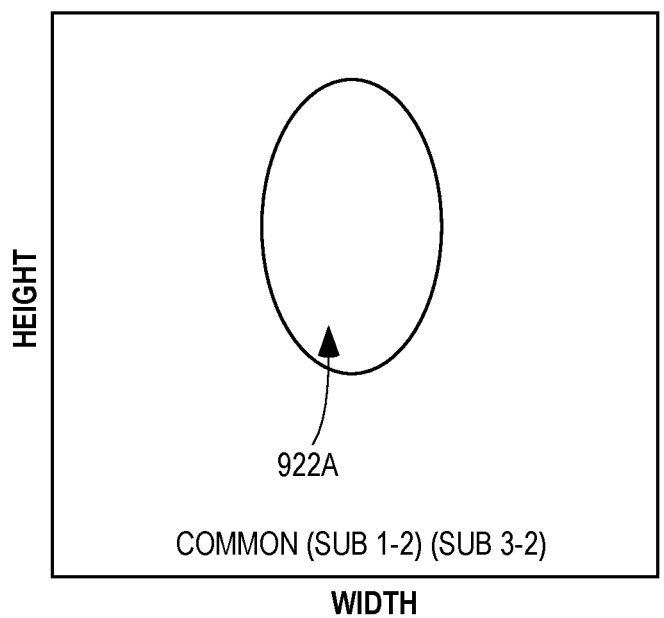
FIG. 9D shows an area of common overlap between FIG. 9B and FIG. 9C.
Figure 9E:
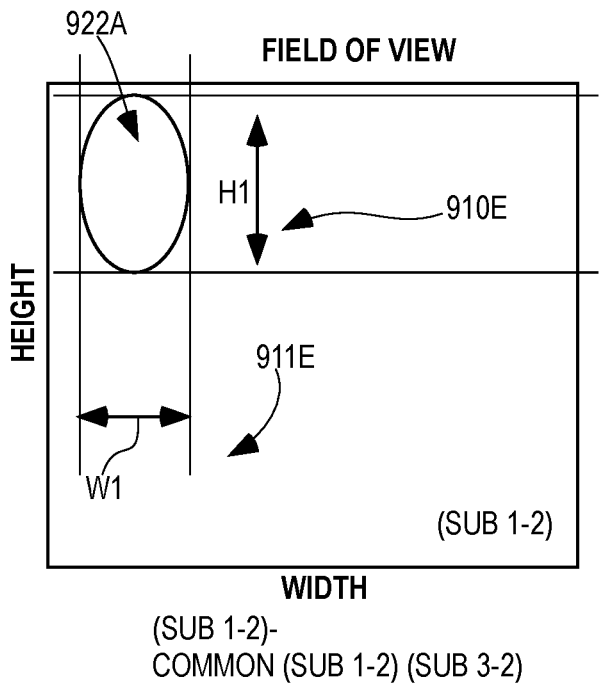
FIG. 9E shows an example of measuring height and width of an object for the combination of the second frame and the first frame of FIG. 9B.
Figure 9F:
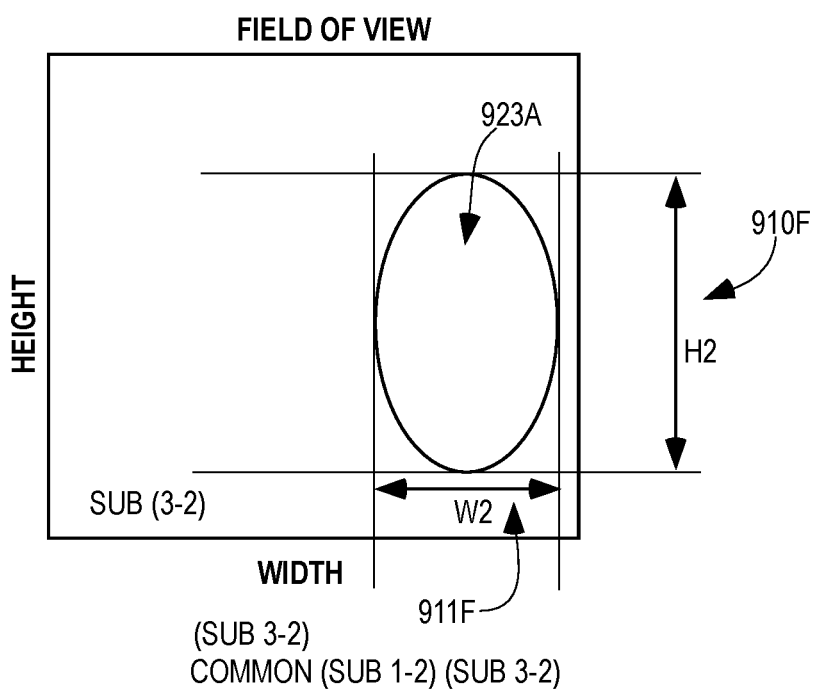
FIG. 9F shows an example of measuring height and width of an object for the combination of the second frame and the third frame of FIG. 9C.

An example of this method is shown in the flow diagram of FIG. 8 and graphically in FIGS. 9-12. Frames 1, 2, and 3 are stacked to make a combined frame 920 shown in FIG. 9A. Frame 1 was captured first in time and the object's first location 921A is in the upper-left corner of the field of view of FIG. 9A. The second frame captured shows that the object's second location 922A located in the center of the field of view in Frame 2, and finally, the object is located 923A in the lower-right corner of Frame 3. To determine the direction of motion of the object, the first step 850 is to subtract the second frame, Frame 2, from the first frame, Frame 1 (FIG. 9B). Optionally a filter is applied to remove noise below a threshold and leave a residual frame having a set of pixels that exceed a brightness change that is above the noise threshold. Similarly, in the second step 852 Sub 3-2 (subtraction of Frame 2 from Frame 3 (FIG. 9C)) is calculated by subtracting Frame 2 from the third, and most recently captured frame in time, Frame 3, with the filter applied to produce a second residual frame with a set of pixels that exceed the same brightness change above the noise threshold. In this manner, steps 850 and 852 have removed the substantially static portions of the consecutive image frames, i.e., the background. FIG. 9D shows the common area of contiguous pixels of Sub 1-2 (FIG. 9B) and Sub 3-2 (FIG. 9C), which in this case is the object location 922A. Sub 1-2's Height 1 910E and Width 1 911E of FIG. 9E are calculated by removing the common area between Sub 1-2 and Sub 3-2 from Sub 1-2 (step 854). Sub 3-2's Height 2 910F and Width 2 911F of FIG. 9F are calculated by removing from Sub 3-2 an area common to both Sub 1-2 and Sub 3-2 (step 856). Once again, sensitivity to motion detection is calculated (858) via the change in height, $\Delta H = H2-H1$, and the change in width, $\Delta W = W2-W1$.

Figure 10A:
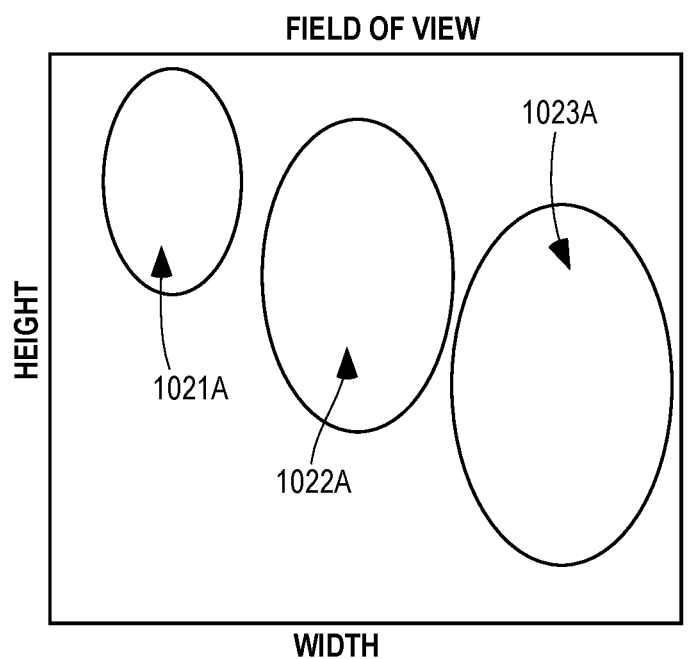
FIG. 10A shows the combination of an object of a first frame, an object of a second frame, and an object of a third frame in the field of view of a camera.
Figure 10B:
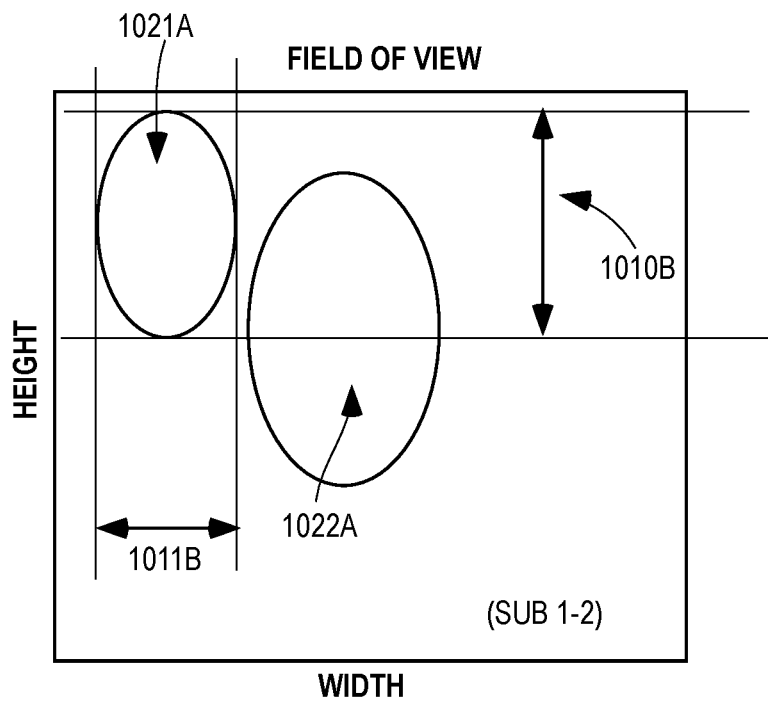
FIG. 10B shows how the height and width of an object are measured for the combination of the second frame and the first frame.
Figure 11A:
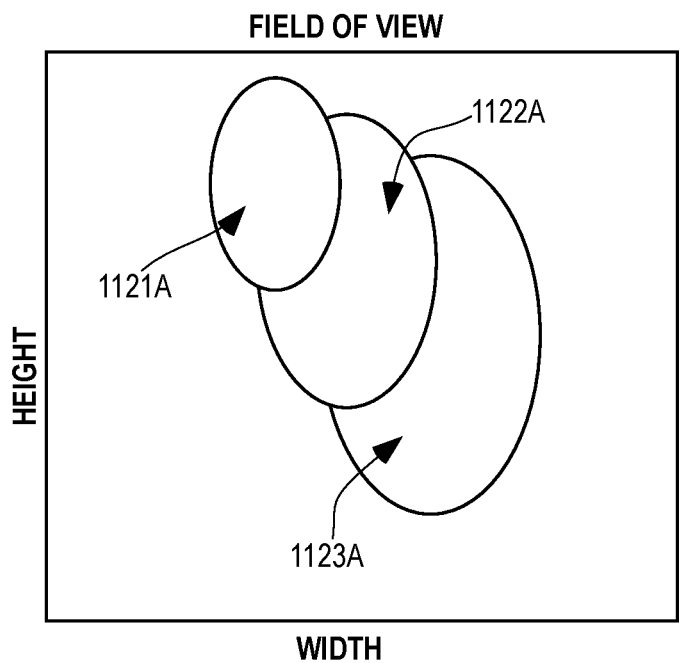
FIG. 11A shows the combination of an object of a first frame, an object of a second frame, and an object of a third frame in the field of view of a camera.
Figure 11B:
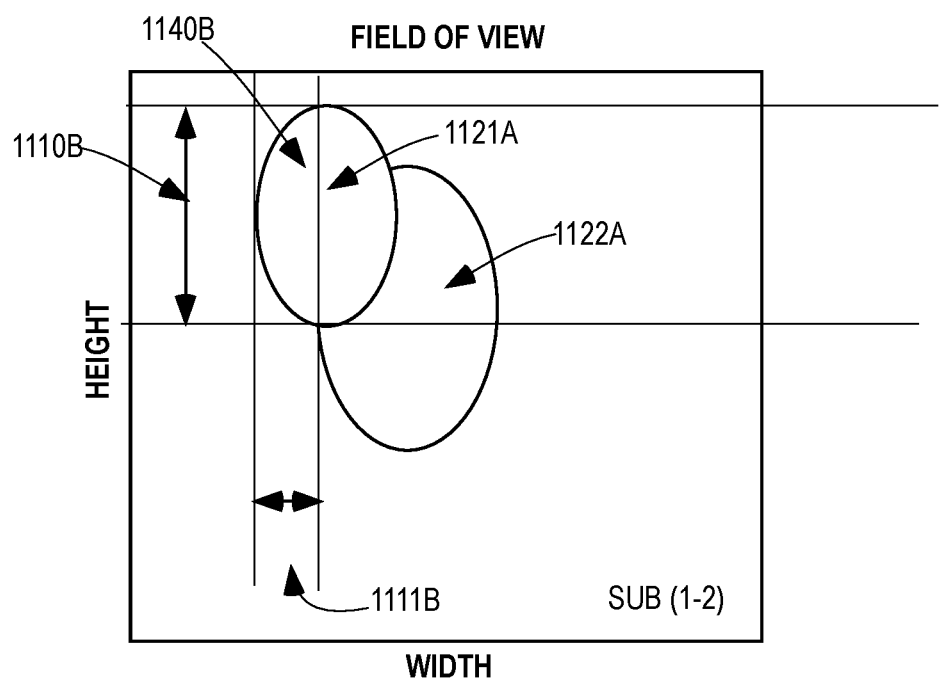
FIG. 11B shows how the height and width of an object are measured for the portion of the object of the first frame that does not overlap with the object in the second frame.
Figure 11C:
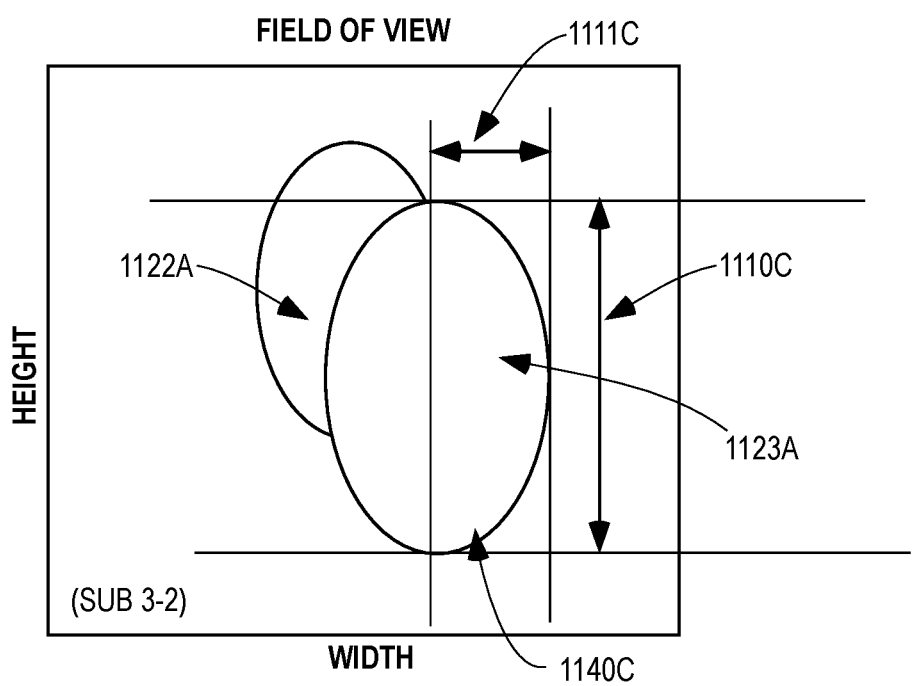
FIG. 11C shows how the height and width of an object are measured for the portion of the object of the third frame that does not overlap with the object in the second frame.

In another embodiment, a method using a camera to detect the direction of motion in a field of view is performed by using at least three frames captured at different times by the camera. Frames 1, 2, and 3 are combined in FIG. 10A to show an object at a first location 1021A, a second location 1022A, and a third location 1023A. FIG. 10B shows the subtraction of Frame 2 from Frame 1. In this example, the step of finding the common area of overlap of contiguous pixels above a threshold between Sub 1-2 and Sub 3-2 is bypassed, and the size of the object from Sub 1-2 to Sub 3-2 is compared. The height 1010C and width 1011C of the object at location 1023A are greater than the height 1010B and width 1011B of the object at location 1021A by a threshold, accordingly the camera detects that the object is approaching. This example still works even when there is overlay of the object between sequential frames, as shown in FIG. 11A. In the same vein as the previous example, Frame 2 is subtracted from Frame 1 in FIG. 11B, and the height 1110B and width 1111B are calculated to be the portion of contiguous pixels above a noise threshold 1140B. As seen in FIG. 11B, a portion of the object may overlap with the location 1122A of Frame 2. During the subtraction process, assuming no significant change in brightness from Frame 1 to Frame 2, the region of overlap (along with the remaining pixels comprising the object in Frame 2) will be below the brightness threshold. Therefore, only a portion of the object from Frame 1 exceeds the brightness threshold. Similarly, in FIG. 11C, Frame 2 is subtracted from Frame 3, and the height 1110C and width 1111C is calculated to be the portion 1140C of the object that does not overlap with the location 1122A of Frame 2. The height 1110C and width 1111C of the portion 1140C are greater than the height 1110B and width 1111B of the portion 1140B, therefore the camera determines that the object is approaching.

Figure 12A:
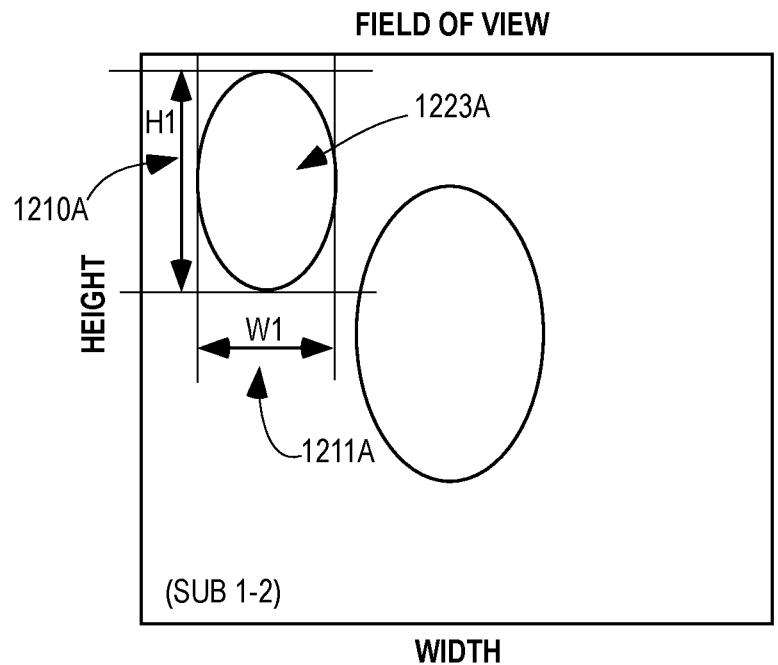
FIG. 12A shows the combination of an object of a first frame, and an object of a second frame in the field of view of a camera.
Figure 12B:
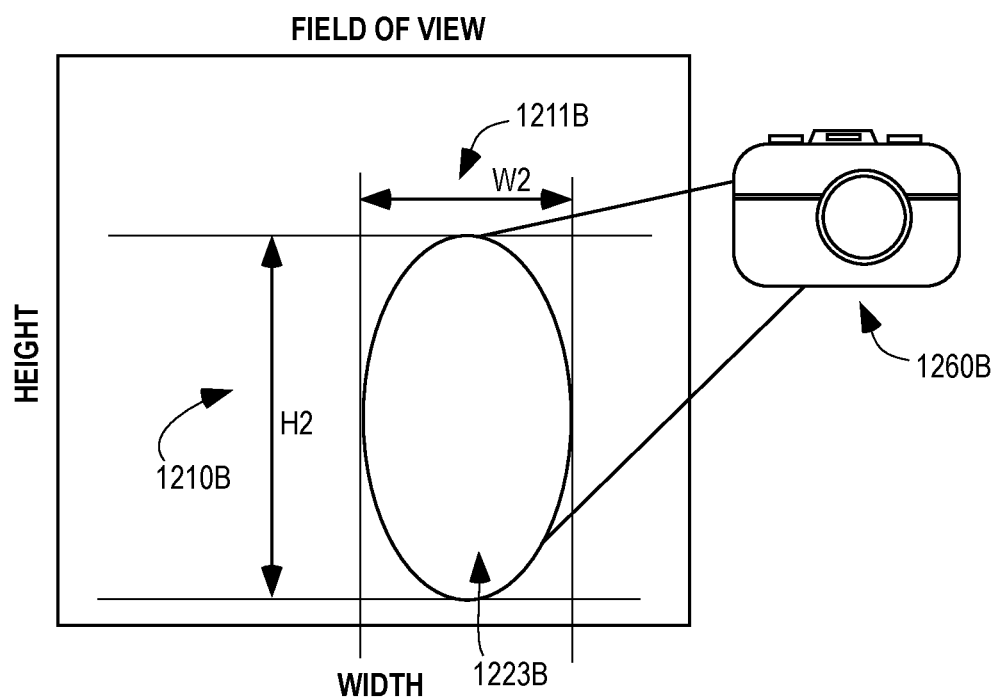
FIG. 12B shows an object in a third frame that is illuminated by a light source.
Figure 12C:
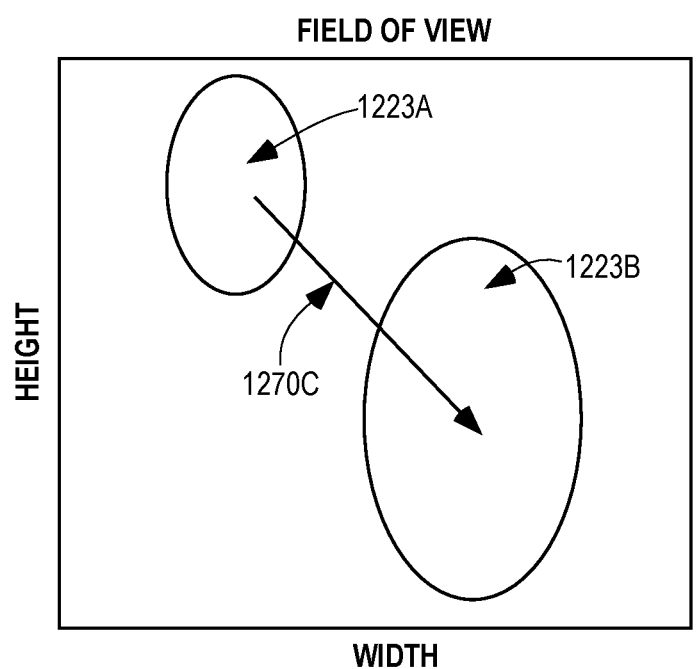
FIG. 12C shows a combined image of FIG. 12A and FIG. 12B, wherein the object is detected to be approaching the camera.

In yet another embodiment, a method using a camera to detect the direction of motion in a field of view is shown in FIGS. 12A-C and is performed by using two frames captured at different times by the camera, and a next frame captured with a light 1260B (see FIG. 12B) illuminating the field of view. Analogous to the first embodiment and demonstrated in FIG. 5, a residual frame illustrated in FIG. 12A is constructed from subtracting the second frame from the first. For the third frame, the light 1260B is activated and an image is captured. In FIG. 12C, the height H2 (1210B) and the width W2 (1211B) of the object's location 1223B in Frame 3 are calculated and compared to the height H1 (1210A) and the width W1 (1211A) of the residual object's location 1223A in Sub 1-2, yielding a direction of motion 1270C.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus for detecting direction of movement, the apparatus comprising:
   a camera;
   a processing circuit in communication with the camera and configured to:
   receive data from the camera representing an image captured in a frame by the camera;
   detect a first size for an object in a field of view for a first frame captured by the camera;
   detect a second size for the object in the field of view for a second frame captured by the camera, the second frame being captured later in time than the first frame;

compare the first size to the second size for the object;
determine, based upon the comparison, that the second size is larger than the first size by more than a first threshold; and
in response to the second size being larger than the first size by more than the first threshold, automatically effect execution of a first action by a device in communication with the camera,
wherein the processing circuit is configured to detect the first size for the object in the field of view for the first frame by:
determining an average pixel brightness for at least two frames captured by the camera;
comparing the average pixel brightness to a pixel brightness value for individual pixels in the field of view of the first frame; and
defining the object as a set of pixels in the field of view of the first frame having a brightness value different from the average pixel brightness by a brightness threshold.

2. The apparatus of claim 1 wherein the processing circuit is further configured to detect the first size for the object in the field of view for the first frame by defining the first size of the object as a first frame total number of pixels in the field of view of the first frame having a brightness value different from the average pixel brightness by the brightness threshold.

3. The apparatus of claim 2 wherein the processing circuit is configured to compare the first size for the object to the second size for the object by comparing the first frame total number of pixels in the field of view of the first frame to a second frame total number of pixels in the field of view of the second frame having a brightness value different from the average pixel brightness for at least two frames captured by the camera by the brightness threshold.

4. The apparatus of claim 1 wherein the processing circuit is further configured to detect the first size for the object in the field of view for the first frame by defining the first size of the object as one or both of: a) a maximum or average width of contiguous pixels in the field of view of the first frame having a brightness value different from the average pixel brightness by the brightness threshold; or b) a maximum or average height of contiguous pixels in the field of view of the first frame having a brightness value different from the average pixel brightness by the brightness threshold.

5. The apparatus of claim 4 wherein the processing circuit is configured to compare the first size for the object to the second size for the object comprises one or both of:
comparing the maximum or average width of contiguous pixels in the field of view of the first frame to a second frame maximum or average width of contiguous pixels in the field of view of the second frame having a brightness value different from an average pixel brightness for at least two frames captured by the camera by the brightness threshold;
comparing the maximum or average height of contiguous pixels in the field of view of the first frame to a second frame maximum or average height of contiguous pixels in the field of view of the second frame having a brightness value different from an average pixel brightness for at least two frames captured by the camera by the brightness threshold.

6. The apparatus of claim 1 wherein the processing circuit is further configured to detect a series of sizes for the object over a series of frames captured by the camera between capturing the first frame and the second frame;
wherein the detecting the series of sizes for the object comprises defining a size of the object in a given frame of the series of frames as a total number of pixels in the field of view of the given frame having a brightness value different from the average pixel brightness by the brightness threshold;
wherein the determining that the second size is larger than the first size by more than the first threshold comprises determining that the sizes of the object are increasing over the series of frames and that a rate of change of the sizes of the object over the series of frames exceeds a rate threshold.

7. The apparatus of claim 1 wherein the processing circuit is further configured to detect a series of sizes for the object over a series of frames captured by the camera between capturing the first frame and the second frame;
wherein the detecting the sizes for the object comprises defining a size of the object in a given frame of the series of frames as a total number of pixels in the field of view of the given frame having a brightness value different from the average pixel brightness by the brightness threshold;
wherein the determining that the second size is larger than the first size by more than the first threshold comprises determining that the sizes of the object are increasing over the series of frames and that a percentage of change of the sizes of the object over the series of frames exceeds a percentage threshold.

8. An apparatus for detecting direction of movement, the apparatus comprising:
a camera;
a processing circuit in communication with the camera and configured to:
receive data from the camera representing an image captured in a frame by the camera;
detect a first size for an object in a field of view for a first frame captured by the camera;
detect a second size for the object in the field of view for a second frame captured by the camera, the second frame being captured later in time than the first frame;
compare the first size to the second size for the object;
determine, based upon the comparison, that the second size is larger than the first size by more than a first threshold; and
in response to the second size being larger than the first size by more than the first threshold, automatically effect execution of a first action by a device in communication with the camera,
wherein the processing circuit is configured to detect the first size for the object in the field of view for the first frame by:
comparing pixel brightness for a set of pixels from a prior frame captured by the camera prior to a corresponding set of pixels from the first frame; and
defining the object as a set of pixels in the field of view of the first frame having a brightness value different from the pixel brightness for corresponding pixels from the prior frame by a pixel brightness threshold.

9. The apparatus of claim 8 wherein the processing circuit is configured to detect the first size for the object in the field of view for the first frame by defining the first size of the object as a first frame total number of pixels in the field of view of the first frame having a brightness value different from the pixel brightness for corresponding pixels from the prior frame by the pixel brightness threshold.

10. The apparatus of claim 9 wherein the processing circuit is configured to compare the first size to the second size for the object by comparing the first frame total number of pixels to a second frame total number of pixels in the field of view of the second frame having a pixel brightness value different from pixel brightness for corresponding pixels from a prior frame captured by the camera by a pixel brightness threshold.

11. The apparatus of claim 8 wherein the processing circuit is configured to detect the first size for the object in the field of view for the first frame by defining the first size of the object as one or both of a maximum or average width of contiguous pixels in the field of view of the first frame having a brightness value different from the average pixel brightness by the brightness threshold or a maximum or average height of contiguous pixels in the field of view of the first frame having a brightness value different from the average pixel brightness by the brightness threshold.

12. The apparatus of claim 11 wherein the processing circuit is configured to compare the first size to the second size for the object by one or both of:
   comparing the maximum or average width of contiguous pixels in the field of view of the first frame to a second frame maximum or average width of contiguous pixels in the field of view of the second frame having a brightness value different from an average pixel brightness for at least two frames captured by the camera by the brightness threshold;
   comparing the maximum or average height of contiguous pixels in the field of view of the first frame to a second frame maximum or average height of contiguous pixels in the field of view of the second frame having a brightness value different from an average pixel brightness for at least two frames captured by the camera by the brightness threshold.

13. The apparatus of claim 8 wherein the processing circuit is further configured to detect that the second size is larger than the first size by more than the first threshold by a series of sizes for the object over a series of frames captured by the camera between capturing the first frame and the second frame;
   wherein the detecting the sizes for the object comprises defining a size of the object in a given frame of the series of frames as a frame total number of pixels in the field of view of the given frame having a brightness value different from the pixel brightness for corresponding pixels from the prior frame by the pixel brightness threshold;
   wherein the determining that the second size is larger than the first size by more than the first threshold comprises determining that the sizes of the object are increasing over the series of frames and that a rate of change of the sizes of the object over the series of frames exceeds a rate threshold.

14. The apparatus of claim 8 wherein the processing circuit is further configured to detect a series of sizes for the object over a series of frames captured by the camera between capturing the first frame and the second frame;
   wherein the detecting the sizes for the object comprises defining a size of the object in a given frame of the series of frames as a frame total number of pixels in the field of view of the given frame having a brightness value different from the pixel brightness for corresponding pixels from the prior frame by the pixel brightness threshold;
   wherein the determining that the second size is larger than the first size by more than the first threshold comprises determining that the sizes of the object are increasing over the series of frames and that a percentage of change of the sizes of the object over the series of frames exceeds a percentage threshold.

15. The apparatus of claim 1 wherein the automatically effecting execution of the first action by the device in communication with the camera further comprises turning on a light that directs illumination into the field of view for the camera.

16. An apparatus for detecting direction of movement, the apparatus comprising:
   a camera;
   a processing circuit in communication with the camera and configured to:
      capture a first frame, a second frame, and a third frame at different times by the camera;
      compare pixel brightness for a set of pixels from the first frame to a corresponding set of pixels from the second frame to eliminate a background and to define a first pixel set having a brightness difference greater than a pixel brightness threshold;
      compare pixel brightness for a set of pixels from the second frame to a corresponding set of pixels from the third frame to eliminate a background and to define a third pixel set having a brightness difference greater than a pixel brightness threshold;
      compare the size of the first pixel set to the size of the second pixel set;
      determine that the size of the second pixel set is larger than the size of the first pixel set by more than a first threshold;
      in response to the size of the second pixel set being larger than the size of the first pixel set by more than the first threshold, automatically effect execution of a first action by a device in communication with the camera.

17. The apparatus of claim 16 wherein the processor circuit is further configured to automatically effect execution of the first action by turning on a light that directs light into the field of view for the camera.

18. The apparatus of claim 8 wherein the automatically effecting execution of the first action by the device in communication with the camera further comprises turning on a light that directs illumination into the field of view for the camera.

* * * * *